United States Patent
Machado et al.

(10) Patent No.: US 11,748,518 B1
(45) Date of Patent: *Sep. 5, 2023

(54) METHOD AND APPARATUS FOR CONTROLLING IOT DEVICES BY AGENT DEVICE

(71) Applicant: Wells Fargo Bank, N.A., San Francisco, CA (US)

(72) Inventors: Caroline Machado, Mountain View, CA (US); Nishant Usapkar, San Ramon, CA (US); Dominik Vltavsky, Belmont, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/676,417

(22) Filed: Feb. 21, 2022

Related U.S. Application Data

(63) Continuation of application No. 15/232,622, filed on Aug. 9, 2016, now Pat. No. 11,256,828.

(Continued)

(51) Int. Cl.
*G06F 21/62* (2013.01)
*H04L 67/12* (2022.01)
(Continued)

(52) U.S. Cl.
CPC ...... *G06F 21/6263* (2013.01); *H04L 63/0428* (2013.01); *H04L 67/12* (2013.01); *H04W 8/005* (2013.01); *H04W 12/02* (2013.01)

(58) Field of Classification Search
USPC .............................................. 726/1, 22–25
See application file for complete search history.

(56) References Cited

U.S. PATENT DOCUMENTS

| | | |
|---|---|---|
| 8,635,307 B2 | 1/2014 | Parks et al. |
| 8,800,021 B1 | 8/2014 | Swaminathan et al. |
| | (Continued) | |

FOREIGN PATENT DOCUMENTS

| | | |
|---|---|---|
| CN | 103037306 | 4/2013 |
| WO | WO-2014/175721 | 10/2014 |
| WO | WO-2015/003844 | 1/2015 |

OTHER PUBLICATIONS

Chang-le Zhong et al., Study on the IOT Architecture and Gateway Technology, 2015, 2015 14th International Symposium on Distributed Computing and Applications for Business Engineering and Science.

(Continued)

*Primary Examiner* — Kambiz Zand
*Assistant Examiner* — Mahabub S Ahmed
(74) *Attorney, Agent, or Firm* — Foley & Lardner LLP

(57) ABSTRACT

Various systems, methods, and apparatuses relate to managing data transmissions from one or more Internet of Things (IoT) devices. A method includes discovering one or more IoT devices; tracking data transmission between the one or more IoT devices and an IoT server; restricting audiovisual data transmission by at least one of the one or more IoT devices based on a user profile associated with a user by providing an instruction to the at least one of the one or more IoT devices; determining that the at least one of the one or more IoT devices is continuing to transmit audiovisual data to the IoT server subsequent to the restriction; based on the determination, denying network access; and presenting, via a user device, a user interface including an indication whether communications to the IoT server have been prevented for each of the one or more IoT devices.

20 Claims, 5 Drawing Sheets

Related U.S. Application Data

(60) Provisional application No. 62/358,492, filed on Jul. 5, 2016.

(51) Int. Cl.
*H04W 8/00* (2009.01)
*H04W 12/02* (2009.01)
*H04L 9/40* (2022.01)

(56) References Cited

U.S. PATENT DOCUMENTS

| | | | |
|---|---|---|---|
| 8,812,028 | B2 | 8/2014 | Yariv et al. |
| 8,914,441 | B2 | 12/2014 | Quintuna |
| 8,983,434 | B2 | 3/2015 | Belanger et al. |
| 9,948,603 | B1* | 4/2018 | Lee .................. H04L 61/106 |
| 10,038,700 | B1* | 7/2018 | Duchin ............... H04L 67/12 |
| 10,057,264 | B1 | 8/2018 | Elnakib et al. |
| 10,212,030 | B2* | 2/2019 | Chakrabarti ....... H04L 41/0895 |
| 2011/0125906 | A1 | 5/2011 | Chunilal |
| 2012/0222083 | A1 | 8/2012 | Vaha-Sipila et al. |
| 2013/0160140 | A1 | 6/2013 | Jin et al. |
| 2014/0059695 | A1 | 2/2014 | Parecki et al. |
| 2014/0066018 | A1 | 3/2014 | Zhu |
| 2014/0244001 | A1 | 8/2014 | Glickfield et al. |
| 2014/0289789 | A1 | 9/2014 | Poornachandran et al. |
| 2015/0006695 | A1 | 1/2015 | Gupta |
| 2015/0019342 | A1 | 1/2015 | Gupta |
| 2015/0019710 | A1 | 1/2015 | Shaashua et al. |
| 2015/0023183 | A1 | 1/2015 | Ilsar et al. |
| 2015/0031335 | A1 | 1/2015 | Dong et al. |
| 2015/0071139 | A1 | 3/2015 | Nix |
| 2015/0089576 | A1* | 3/2015 | Poroor ................ H04L 63/20 726/1 |
| 2015/0128205 | A1 | 5/2015 | Mahaffey et al. |
| 2015/0128285 | A1 | 5/2015 | Lafever et al. |
| 2015/0134801 | A1 | 5/2015 | Walley et al. |
| 2015/0134954 | A1 | 5/2015 | Walley et al. |
| 2015/0156266 | A1 | 6/2015 | Gupta |
| 2015/0188949 | A1 | 7/2015 | Mahaffey et al. |
| 2015/0237013 | A1 | 8/2015 | Bansal et al. |
| 2015/0237071 | A1* | 8/2015 | Maher ................ H04L 63/20 726/1 |
| 2015/0249672 | A1* | 9/2015 | Burns ............... G06F 21/629 726/4 |
| 2015/0295763 | A1 | 10/2015 | Yu et al. |
| 2015/0326610 | A1 | 11/2015 | Bartoszewski et al. |
| 2015/0358777 | A1 | 12/2015 | Gupta |
| 2016/0103666 | A1* | 4/2016 | Choi .................. G06F 8/4441 717/153 |
| 2016/0105402 | A1 | 4/2016 | Soon-Shiong et al. |
| 2016/0105501 | A1* | 4/2016 | Choi .................. H04L 67/02 709/225 |
| 2016/0112374 | A1 | 4/2016 | Branca |
| 2016/0128043 | A1* | 5/2016 | Shuman ............. H04W 72/044 370/329 |
| 2016/0134932 | A1 | 5/2016 | Karp et al. |
| 2016/0149878 | A1 | 5/2016 | Pogorelik et al. |
| 2016/0150350 | A1* | 5/2016 | Ingale ................. H04W 4/38 370/255 |
| 2016/0173495 | A1 | 6/2016 | Joo |
| 2016/0179962 | A1 | 6/2016 | Patten et al. |
| 2016/0182497 | A1 | 6/2016 | Smith |
| 2016/0182556 | A1* | 6/2016 | Tatourian ........... G06F 21/554 726/25 |
| 2016/0188902 | A1* | 6/2016 | Jin .................... H04W 4/029 726/28 |
| 2016/0197772 | A1 | 7/2016 | Britt et al. |
| 2016/0197798 | A1 | 7/2016 | Britt et al. |
| 2016/0205078 | A1* | 7/2016 | James ................. H04L 9/006 713/171 |
| 2016/0212099 | A1* | 7/2016 | Zou ................. H04L 63/1408 |
| 2016/0234312 | A1 | 8/2016 | Vasamsetti et al. |
| 2016/0267408 | A1* | 9/2016 | Singh ................. G06N 5/022 |
| 2016/0283745 | A1* | 9/2016 | LaFever ............. G06F 21/6218 |
| 2016/0285979 | A1 | 9/2016 | Wang et al. |
| 2016/0294828 | A1* | 10/2016 | Zakaria .............. H04W 12/06 |
| 2016/0301707 | A1* | 10/2016 | Cheng ................ H04L 67/12 |
| 2016/0364553 | A1 | 12/2016 | Smith et al. |
| 2016/0381030 | A1* | 12/2016 | Chillappa ........... H04W 4/38 726/11 |
| 2017/0005820 | A1* | 1/2017 | Zimmerman ........ G05B 15/02 |
| 2017/0005982 | A1 | 1/2017 | Gould et al. |
| 2017/0006135 | A1 | 1/2017 | Siebel |
| 2017/0006595 | A1* | 1/2017 | Zakaria .............. H04L 67/025 |
| 2017/0011053 | A1 | 1/2017 | Hubbard et al. |
| 2017/0026472 | A1 | 1/2017 | Bugenhagen et al. |
| 2017/0034179 | A1* | 2/2017 | Carames ............. H04L 63/10 |
| 2017/0063823 | A1* | 3/2017 | Cheng ................ H04W 12/08 |
| 2017/0063968 | A1 | 3/2017 | Kitchen et al. |
| 2017/0078398 | A1 | 3/2017 | Haidar et al. |
| 2017/0093915 | A1 | 3/2017 | Ellis et al. |
| 2017/0093982 | A1 | 3/2017 | Shaashua et al. |
| 2017/0094018 | A1 | 3/2017 | Ekstrom et al. |
| 2017/0103327 | A1 | 4/2017 | Penilla et al. |
| 2017/0126836 | A1 | 5/2017 | Krishna |
| 2017/0149775 | A1* | 5/2017 | Bachar ............... H04L 67/303 |
| 2017/0149928 | A1 | 5/2017 | George et al. |
| 2017/0155710 | A1* | 6/2017 | Quinn ................ H04L 67/56 |
| 2017/0163444 | A1 | 6/2017 | McLaughlin et al. |
| 2017/0168777 | A1* | 6/2017 | Britt .................... G06F 8/20 |
| 2017/0177798 | A1* | 6/2017 | Samuel ............... H04L 67/12 |
| 2017/0180380 | A1 | 6/2017 | Bagasra |
| 2017/0201504 | A1* | 7/2017 | Funk ................ H04L 63/0471 |
| 2017/0201585 | A1 | 7/2017 | Doraiswamy et al. |
| 2017/0208079 | A1 | 7/2017 | Cammarota et al. |
| 2017/0208139 | A1 | 7/2017 | Li et al. |
| 2017/0214701 | A1 | 7/2017 | Hasan |
| 2017/0220817 | A1* | 8/2017 | Shen ................. G06F 21/6254 |
| 2017/0230402 | A1* | 8/2017 | Greenspan ......... H04W 12/08 |
| 2017/0230848 | A1* | 8/2017 | Brouillette .......... H04W 24/10 |
| 2017/0257322 | A1 | 9/2017 | Nagao |
| 2017/0257341 | A1* | 9/2017 | Arsenault ........... H04L 67/51 |
| 2017/0272842 | A1 | 9/2017 | Touma et al. |
| 2017/0272940 | A1 | 9/2017 | Ghosh et al. |
| 2017/0295141 | A1 | 10/2017 | Thubert et al. |
| 2017/0323068 | A1* | 11/2017 | Dintenfass ......... H04L 67/306 |
| 2017/0332232 | A1* | 11/2017 | Weinberg ............ H04W 4/14 |
| 2017/0339248 | A1* | 11/2017 | Karalis .............. H04L 63/1433 |
| 2017/0351504 | A1 | 12/2017 | Riedl |
| 2017/0352245 | A1 | 12/2017 | Maher et al. |
| 2017/0359417 | A1 | 12/2017 | Chen et al. |
| 2017/0374490 | A1 | 12/2017 | Schoppmeier |
| 2018/0007058 | A1 | 1/2018 | Zou et al. |
| 2018/0011973 | A1* | 1/2018 | Fish .................... A61B 5/1176 |
| 2018/0014198 | A1 | 1/2018 | Suh et al. |
| 2018/0069696 | A1 | 3/2018 | Yoo et al. |
| 2018/0082384 | A1 | 3/2018 | Karroum |
| 2018/0095155 | A1 | 4/2018 | Soni et al. |
| 2018/0190096 | A1* | 7/2018 | Lundy ................ G08B 21/02 |
| 2018/0198841 | A1* | 7/2018 | Chmielewski ....... G08B 25/08 |
| 2018/0264347 | A1* | 9/2018 | Tran .................. H04Q 9/00 |
| 2018/0330100 | A1* | 11/2018 | Bar Joseph ......... H04W 12/08 |
| 2018/0332434 | A1 | 11/2018 | Kulkarni et al. |
| 2019/0020439 | A1* | 1/2019 | Fawaz ............... H04K 3/45 |
| 2019/0190939 | A1* | 6/2019 | Cheng ................ H04L 41/069 |

OTHER PUBLICATIONS

Dawson, I., Sponsored APP Review: AVG PrivacyFix, Android Headlines, Jan. 31, 2014, retrieved from the Internet at http://www.androidheadlines.com/2014/01/sponsored-app-review-avg-privacyfix.html on Sep. 27, 2016, 13 pages as printed.

Federal Trade Commission, Internet of Things, FTC Staff Report, Jan. 2015, 71 pages.

Myles et al., Preserving Privacy in Environments with Location-Based Applications, Pervasive Computing, vol. 2, No. 1, Jan.-Mar. 2003, 9 pages.

Seang-Min Kim et al., IoT Home Gateway for Auto-Configuration and Management of MQTT Devices, 2015, 2015 IEEE Conference on Wireless Sensors.

(56) References Cited

OTHER PUBLICATIONS

Soheil Qanbari et al., Gatica: Linked Sensed Data Enrichment and Analytics Middleware for IoT Gateways, 2015, 2015 3rd International Conference on Future Internet of Things and Cloud.

Soumya Kanti Datta et al., An IoT Gateway Centric Architecture to Provide Novel M2M Services, 2014, 2014 IEEE World Forum on Internet of Things (WF-IoT).

* cited by examiner

METHOD AND APPARATUS FOR CONTROLLING IOT DEVICES BY AGENT DEVICE

CROSS-REFERENCE TO RELATED APPLICATIONS

This application is a continuation of U.S. application Ser. No. 15/232,622, filed Aug. 9, 2016, which claims the benefit of and priority to U.S. Provisional Patent Application No. 62/358,492 filed Jul. 5, 2016, each of which are incorporated herein by reference in their entirety and for all purposes.

TECHNICAL FIELD

Embodiments of the present disclosure relate to filtering communications of Internet of Things (IoT) devices.

BACKGROUND

The Internet of Things (IoT) is a network of devices that are able to capture and exchange data. The devices connected to the IoT can be referred to as IoT devices. Today, there are numerous IoT devices in use. Many of these IoT devices are wireless devices such as smartphones, tablet computers, personal computers (PCs), media players and readers, headsets, cameras, vehicles, wearable fitness devices, health monitoring devices, thermostats, refrigerators, televisions, home security systems, and so forth. Many of these IoT devices use some form of electromagnetic (EM) or radio frequency (RF) technology for communications with other devices and a network, such as the Internet.

In some instances, concern has been expressed about the data acquiring abilities of the IoT devices. Users may not be aware of the data that is being collected about them by the devices around them, nor may they be aware of the range of third parties having access to such data. For example, laptop computers include video and audio acquiring capabilities. Reports of instances in which third parties have gained surreptitious access to such data acquiring capabilities unbeknownst to the owner of the laptop have occurred. Likewise, other devices contain GPS circuitry, potentially allowing the whereabouts of the user to be tracked. Further, other devices include activity and health monitoring circuitry, which may generated data that may be similarly tracked. Similar issues exist with other types of IoT devices.

SUMMARY

One embodiment relates to a system that includes an IoT network agent in data communication with the one or more IoT devices. The IoT network agent is configured to: discover the one or more IoT devices and to control data communications from the one or more IoT devices.

Another embodiment relates to a method. The method includes discovering, by a discovery engine, one or more Internet of Things (IoT) devices; tracking, by the discovery engine, data transmission from the one or more IoT devices; generating, by a privacy lens communicably coupled to the discovery engine, a privacy rule regarding the data transmission from the one or more IoT devices; and applying, by the privacy lens, the privacy rule to the one or more IoT devices, the privacy rule configured to control data transmission from the one or more IoT devices.

Still another embodiment relates to an apparatus. The apparatus includes a discovery engine configured to: discover one or more Internet of Things (IoT) devices, and acquire information indicative of data transmissions of the one or more IoT devices. The apparatus also includes a privacy lens communicably coupled to the discovery engine, the privacy lens configured to manage data transmissions from the one or more IoT devices based on a user profile of a user associated with the one or more IoT devices.

DETAILED DESCRIPTION

Figure 1:
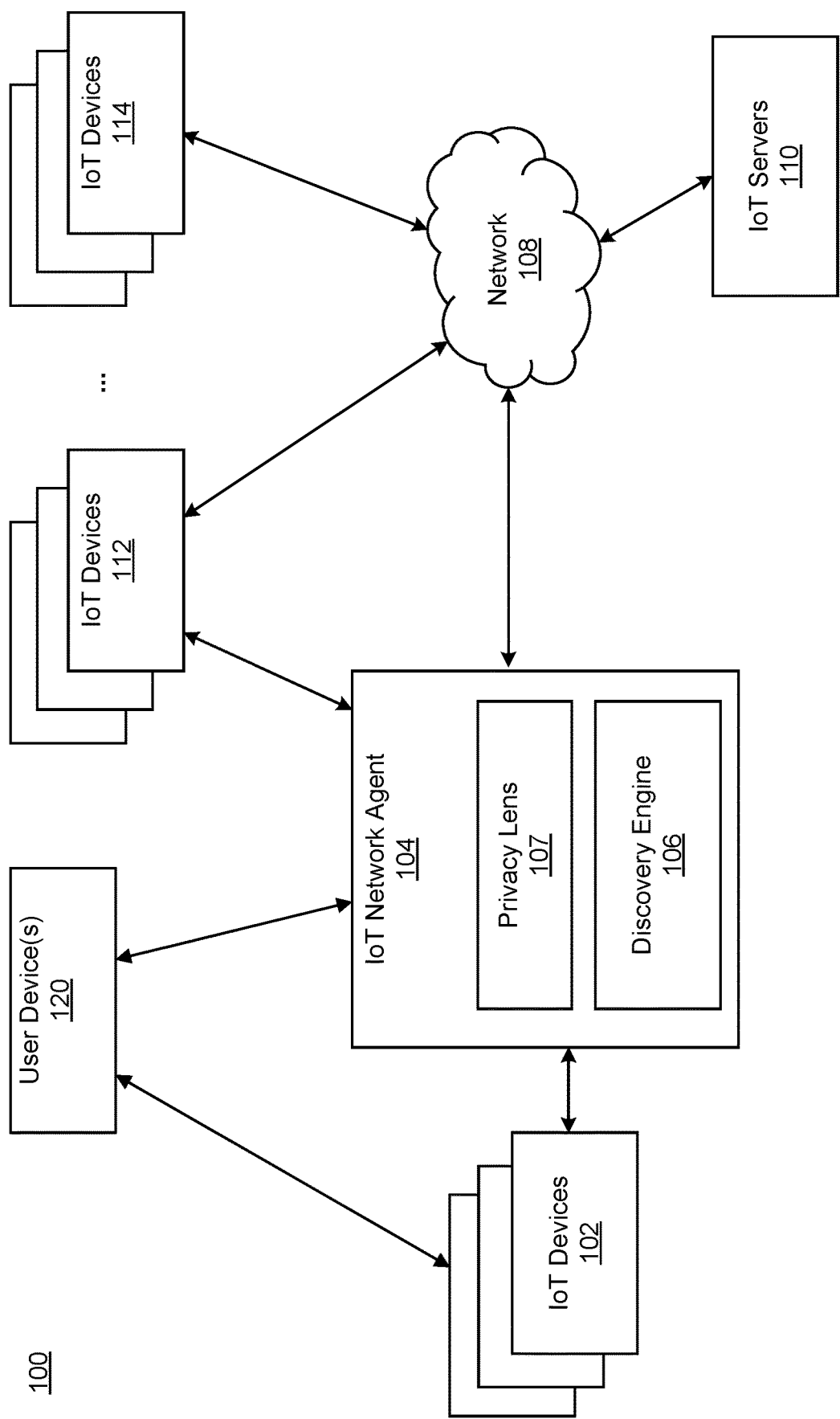
FIG. 1 is a schematic diagram of an Internet of Things (IoT) communication system, according to an example embodiment.

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

Referring to the Figures generally, various systems, methods, and apparatuses for providing a user with control of information that is shared by the user's Internet of Things (IoT) devices are disclosed herein. According to the present disclosure, the user control can include, but is not limited to, determining what types of information are being transmitted by which IoT devices that are located in the vicinity of the user. For example, it may be determined that a laptop computer is transmitting audio and/or video data to a remote server. As another example, it may be determined that a personal fitness device is transmitting data to a remote server. The user may then exercise control to prevent the transmission of such data. As other examples, the user control can include an amount of information that is transmitted from each of the user's IoT devices, determining a timing (e.g., time of day, calendar time, etc.) and frequency of transmission of the information for one or more of the user's IoT devices, and so on.

In this regard, the system of the present disclosure includes one or more discovery engines and one or more privacy lenses. In some embodiments, the one or more discovery engines and the one or more privacy lenses are within the one or more user IoT devices. In some other embodiments, the one or more discovery engines and the one or more privacy lenses are within one or more network agents (i.e., a wireless router for providing and supporting connectivity of the IoT device to a network, such as the Internet). In yet some other embodiments, the one or more discovery engines are in different devices than the one or more privacy lenses. For example, the one or more discovery engines may be within one or more user IoT devices while the one or more privacy lenses may be within the one or more network agents. Accordingly, the present disclosure contemplates a wide variety of implementation structures and architectures with all such variations intended to fall within the scope of the present disclosure.

The one or more discovery engines may be structured to identify all or mostly all of the IoT devices that are transmitting data within an IoT network. For example, the one or more discovery engines may be structured to discover what IoT devices are activated around a user (i.e., what IoT devices are currently ON and transmitting data), what data is shared between the IoT device and an agent supporting the particular IoT device (e.g., a remote server for that IoT device), when the data is transmitted for each of the IoT devices, and so on. The one or more discovery engines may further be configured to monitor user activities and user possessions and generate a user profile in response to the monitoring. Upon generation, the one or more discovery engines may transmit the user profiles to the one or more privacy lenses. Responsive to receiving the user profile, the one or more privacy lenses may be structured to automatically or semi-automatically control what data to share, when to share the data, and so on. For example, the IoT privacy lens may be configured to determine a specific time to share selected data, determine a recurring event of sharing selected data at a desired frequency, etc. Accordingly, the system may provide the user with an ability to control information that is shared by the user's one or more IoT devices.

In some embodiments, manufacturers of IoT devices assist in facilitating the operation of the discovery engines and/or the one or more privacy shields. For example, device manufacturers may agree to a technical standard for making IoT devices, discovery engines, and privacy lenses that are interoperable in the manner described herein. Devices that are manufactured in this way may then be certified as such, e.g., akin to the manner in which a third-party certification process is used to allow product manufacturers to advertise products as being "Energy Star compliant." Consumers may then consider such certification as a factor to be considered when purchasing IoT devices. For example, IoT devices may be manufactured to transmit metadata about data that the IoT devices is collecting in compliance with a technical standard reached as a result of a standards setting process. For example, if a video camera on the IoT device is currently active, the IoT device may be configured to transmit data indicating that the video camera is active (e.g., without transmitting the video data itself, to avoid unsecure transmission of the video data). In some embodiments, such metadata transmitting capabilities may be hardwired into the IoT device, i.e., unalterable in BIOS/firmware/software/etc. In some arrangements, the certification may be subjected to a public key/private digital signature arrangement, such that the IoT device may be interrogated by the discovery engine to allow the authenticity of any certification held by the IoT device may be verified.

In addition or as an alternative, a manufacturer of the discovery agent and privacy lens may perform a technical analysis of third party IoT devices and store device profile information regarding the third party IoT devices in a remote database. During operation of the discovery agent and privacy lens, the transmissions of the IoT devices may be received by the discovery agent and sent to the remote database for analysis. Based on the analysis, the user may be alerted that an IoT device in the user's vicinity is transmitting data to a remote location and, if known, the type of data that is being transmitted.

Technically and advantageously, the discovery engine and privacy lens of the present disclosure may allow the user to control the types of data being transmitted and acquired by their IoT devices. In this regard, the user may prevent or substantially prevent data acquisition and transmission of user-considered sensitive pieces of data. As a result, the user may achieve peace of mind knowing that their data may remain substantially private or confidential. Further, due to such control, the present disclosure may facilitate transformation of the IoT devices from data acquiring devices independent of user control to data acquiring devices controllable by an associated user (e.g., owner). Additionally, in some embodiments, the discovery engine and privacy lens may be implemented in hardware that is physically separate from the user's IoT devices. Hence, in order to gain surreptitious access to a user's IoT device (e.g., a user's laptop computer), a third party would have defeat not only the security mechanisms onboard the IoT device, but also the security mechanisms provided by the discovery engine and privacy lens, which are physically separate from the user's IoT device.

Referring now to FIG. 1, a schematic diagram of an IoT communication system 100 is shown, according to an example embodiment. The IoT communication system 100 includes one or more user IoT devices 102, an IoT network agent 104, a network 108, IoT servers 110, one or more third-party IoT devices 112 and 114, and a user device 120 associated with a user. The user may include individuals, business representatives, large and small business owners, and any other entity.

The one or more IoT devices 102 are associated (e.g., owned, leased, possessed by, etc.) with the user, whereas the one or more third-party IoT devices 112, 114 are not associated with the user (e.g., not owned, possessed by, etc.). For example, the IoT devices 112, 114 may be devices that are in the vicinity of the user, but that are associated with third parties. Accordingly, the user IoT devices 102 form a local network specific to the user. As described herein below, the local network may be determined by the discovery engine 106 and/or from explicit user input. In comparison, the third-party IoT devices 112, 114 may form part of the same or another network.

The network 108 may be any type of network, such as the Internet. The network 108 is structured to permit the exchange of data, values, instructions, messages, and the like between and among the user device 120, a user IoT device 102, selectively with third party IoT devices 112 and 114, and/or IoT servers 110.

As shown, the user may have or be associated with a user device 120 used to access the privacy lens 107. Specifically, and as described in more detail below, via the user device 120, the user may define one or more settings of the privacy lens 107 and observe information regarding the user IoT devices 102. For example, via a graphical user interface generated by the privacy lens 107 and provided on the user device 120, the user may observe what devices are recognized (e.g., recognized as being compliant with the above-mentioned standard) and what devices are unrecognized (e.g., not recognized as being compliant with the above-mentioned standard), what devices are transmitting data, the type of data being transmitted, the frequency of transmission, and so on. Further, and as described in more detail below, via the graphical user interface, the user may block or otherwise set restrictions on the transmission of data by the IoT devices. The user device 102 may be connected to the Internet and, as such, may be considered an IoT device as well. The user device 120 may be a mobile device, such as a laptop computer, a phone (e.g., a smartphone, etc.), a tablet, a wearable device (e.g. a smart watch, smart glasses, a smart bracelet), and so on. Accordingly, the user device 120 may include a display device (e.g., a screen) and one or more input/output devices (e.g., a touch screen, microphone, speaker, keyboard, etc.).

The IoT network agent 104 may be configured to communicably and operatively couple the IoT devices 102 to the network 108 (e.g., the Internet). Accordingly, the IoT network agent 104 may have any structure and configuration that facilitates communicable coupling of the user IoT devices 102 to the network 108. In this regard and as described above, because the network 108 may vary from application-to-application, the configuration of the IoT network 104 may also vary. For example, in some embodiments, the IoT network agent 104 may be structured as a wireless router. In yet other embodiments, the IoT network agent may support Cellular communications (e.g., a wireless hotspot). Accordingly, as those of ordinary skill in the art will appreciate, the configuration of the IoT network agent 104 may vary greatly from application-to-application.

The IoT devices 102 and third-party IoT devices 112, 114 may be any object that is networked via a communication network, such as a global communication network (e.g., the internet). The "networked" characteristic of the object allows the object to communicate over the network 108 with a target recipient, such as the IoT server 110. The communications may include one-way and two-way communications. In a one-way communication embodiment, the object may either only receive or only send data with a receiver and transmitter, respectively. In a two-way communication embodiment, the object may both transmit and receive data with another entity. A non-limiting and non-exhaustive list of potential IoT devices 102, 112, and 114 includes the following: a mobile phone, a smart digital video disc (DVD) or Blu-Ray player, streaming media device, an intelligent or smart oven, an intelligent or smart dishwasher, a computing device (e.g., laptop computer, personal computer, tablet computer, etc.), a smart refrigerator, a smartwatch, a smart alarm clock, a vehicular control system, a control system embodied in other engine-driven devices (e.g., a lawnmower, snowblower, etc.), smart manufacturing equipment, smart healthcare equipment, smart energy management and/or utilities equipment (e.g., gas and/or electric meters), smart Internet routers, transportation equipment (e.g., train control systems, etc.), building and home temperature management systems (e.g., heating ventilation and air conditioning systems), and so on. To be networked, the IoT devices 102, 112, and 114 may include any type of network interfacing logic including, but not limited to, near-field communication chips, radio frequency identification chips, Bluetooth, Zigbee, WI-FI, and any other wireless or wired standard, network, or protocol. Accordingly, and as understood herein, the IoT device 102, 112, and 114 structure and function is meant to be broadly interpreted.

As indicated above, the IoT devices 102 may transmit data to the IoT servers 110 through the network 108. Each IoT server 110 may be structured as a central server, a group of servers, and any/or other group of processing components that are structured to exchange data with one or more IoT devices 102. In this regard, each IoT device manufacturer or supporter/producer/etc. may also have or support a cloud (i.e., the IoT server 110) that enables the exchange of information between the IoT device and the cloud. Accordingly, there may be multiple IoT servers 110 for each IoT device.

The IoT server 110 may be configured to transmit received data from the corresponding IoT device to other devices, such as the third party IoT devices 112, 114. In other embodiments, the IoT devices 102 and third party devices may communicate directly. Communication to and from the IoT server 110 may be over the network 108 and be supported by the IoT network agent 104.

The IoT servers 110 are each associated with one or more of the IoT devices 102, 112, 114. For a given IoT device 102, 112, or 114, the associated IoT server 110 may control the type and frequency of data communications from the associated IoT device 102, 112, and 114. For example, in some embodiments, as described herein, the privacy lens 107, via a directive from the user, may communicate with the IoT server 110 to receive, view and/or analyze IoT tracked data that may otherwise be considered proprietary (i.e., encrypted or otherwise hidden from entities not associated with the IoT device and its corresponding IoT server). Such an arrangement may be used, for example, where a user has purchased an IoT device and then registered ownership of the IoT device with the manufacturer, e.g., via an online registration process. As a result, the privacy lens 107 may then receive certain privileges from the IoT server 110, such as tracking and controlling the data acquired by each IoT device 102. In turn, a user may define, via the user device 120, the types of data that are acceptable to the user for transmitting.

Referring still to FIG. 1 and as shown, the IoT network agent 104 includes a discovery engine 106 and a privacy lens 107. In particular, the IoT network agent 104 may monitor and/or control communications of the IoT devices 102, 112, 114 either alone or with the assistance of other devices, such as the IoT servers 110, the IoT devices 102, 112, 114, and/or other devices. While in some instances specific reference is made to the IoT devices 102, it will be appreciated that the same monitoring and/or control may also be performed with respect to the IoT devices 112, 114.

The discovery engine 106 may be configured to detect and monitor the data communications of the user IoT devices 102. In this regard and in one embodiment, because the IoT network agent 104 supports communications through the network 108 (e.g., as a wireless router), the IoT network agent 104 may serve as an intermediary for such communications. As a result, communications to and from the user IoT devices 102 may be detected and monitored through the IoT network agent 104.

The discovery engine 106 may employ various processes to detect and monitor the data communications of the IoT devices 102. As previously noted, in one embodiment, manufacturers of IoT devices assist in facilitating the operation of the discovery engines and/or the one or more privacy shields. For example, device manufacturers may agree to a technical standard for making IoT devices, discovery engines, and privacy lenses that are interoperable in the manner described herein. In such an embodiment, the discovery engine 106 may detect and monitor the data communications of the IoT devices 102 via interaction with the IoT devices 102 (e.g., the IoT devices 102 may broadcast their presence and transmit metadata concerning the type of information they are transmitting). As another example, in such an embodiment, the discovery engine 106 may interact with the respective IoT server 102 to determine information about the type(s) of data being transmitted, the frequency of communication, and so on.

As another example, in one embodiment, the discovery engine 106 may be configured to detect a device type for each of the user IoT devices 102 and then access a remote database to determine information about the type(s) of data being transmitted, the frequency of communication, and so on. For example, a manufacturer of the discovery agent and privacy lens may perform a technical analysis of third party IoT devices and store device profile information regarding the third party IoT devices in a remote database. During operation of the discovery agent and privacy lens, the transmissions of the IoT devices may be received by the discovery agent and sent to the remote database for analysis. Based on the analysis, the user may be alerted that an IoT device in the user's vicinity is transmitting data to a remote location and, if known, the type of data that is being transmitted.

Based on the foregoing, the discovery engine 106 may include a variety of configurations that facilitate the monitoring and detecting of data communications both to and from the user devices 102. For example, in one embodiment, the discovery engine 106 may be configured as a separate hardware component, such as a network hub (e.g., wireless router) that includes a variety of communication protocols (e.g., Z-wave, Zigbee, Insteon, etc.) for detecting IoT devices independent of each device's particular communication protocol. In another example, the discovery engine 106 may include a sensor (e.g., a data tracking Bluetooth sensor) that facilitates detection of the IoT devices 102. The discovery engine 106 may include machine-readable media operable to execute a detection program that facilitates the scanning of a predefined area for network-connected devices. For example, the machine-readable media may acquire data indicative of one or more ports associated with a device to facilitate identification thereof (e.g., ports can include, but are not limited to, HTTP, SSH, FTP, and SNMP). In yet further embodiments, the discovery engine 106 may include any combination of hardware and machine-readable components for detecting and monitoring IoT devices.

In one embodiment, the discovery engine 106 may be configured to detect which user IoT devices are communicating data and determine a device type for the detected user IoT device. The discovery engine 106 may be configured to send the determined device type to the user device 120. Responsive to receiving the determined device type, the user device 120 may be configured to determine and monitor what data is transmitted in the detected communications based on information received from the associated IoT server 102, based on information from a remote database (e.g., storing device profile data for IoT devices from various manufacturers), based on real time analysis of the communications from the IoT device, or in another manner. In some embodiments, the discovery engine 106 may be further configured to determine a timing and/or frequency for each type of data transmission within the communications (or, in other embodiments, for the communication as a whole). For example, the discovery engine 106 may be configured to detect a health application running on a user's smart watch that is sharing data with the user's smart phone and laptop. The discovery engine 106 may determine that the health application belongs to a device type of personal care or health monitor and send the determined device type to the user device 120. The user device 120 may be configured to monitor the communications between the user's smart watch and the smart phone and the laptop based on the determined device type. In this regard, the discovery engine 106 may also observe or monitor when the communications are transmitted (i.e., a timing) and how often the communications are transmitted (i.e., a frequency).

The discovery engine 106 may also be configured to detect and monitor the external data communications through the network 108, such as transmissions of the third party IoT devices 112, 114. The same or substantially the same monitoring and detection strategies, processes, and methods may also be used to monitor and detect such external communications. In this regard, the discovery engine 106 may be configured to monitor and detect similar characteristics of external communications from the user IoT devices 102. For example, the discovery engine 106 may be configured to detect all the user IoT devices 102 connected to the network 108 and sharing information with one or more third-party IoT devices via the network 108. As another example, the discovery engine 106 may be configured to monitor what types of data are shared by each of the user IoT devices 102 and to which third party IoT devices. As yet another example, the discovery engine 106 may be configured to detect the timing and/or frequency of each data transmission in the external communications.

In some embodiments, the discovery engine 106 may be configured to generate a risk score for each user IoT device 102 based on the device type of the IoT device. The device type may be used to determine what data can be shared by the IoT device 102 internally and/or externally. As used herein, the "risk score" refers to a value, classification (e.g., low, medium, high), ranking, or the like that indicates potential privacy concerns for the user due to the transmission of the data acquired by user IoT devices 102. Classification of sensitive data may be based on a user input via the user device 120 and/or default settings. In this regard, a higher risk score indicates that that device is transmitting relatively more data and/or more sensitive types of data. In turn, the user may be more at risk from devices with higher risk scores.

The risk score may be based on the type of data being shared by the user IoT device 102. In this regard, the type of data being shared is highly variable and may differ among IoT devices. A non-exhaustive list of data includes video and/or audio data (e.g., from a user's laptop computer), geolocation data (e.g., from a user's smart phone), physiological data (e.g., from a user's health monitoring device), usage data (e.g., from equipment owned by the user, such as a vehicle, a Blu Ray player, a smart oven, a smart dishwasher), and so on. Due to this range of data types, a user, via the graphical user interface on the user device 120, may be presented with an ability to observe each data type being acquired or transmitted by each specific IoT device. Each type of data may then be classified, such as into categories of low risk, medium risk, and high risk. The high risk classification may then correspond with a relatively higher risk score than the medium and low risk classifications.

In some embodiments, the generated risk scores can be used to generate a ranked list of the user IoT devices 102. For example, a list may be generated that organizes the user IoT devices 102 from most risky to least risky (e.g., audio-visual data from a user's laptop may be deemed as more risky than usage data from a smart oven). The list may be transmitted to the user device 120, where the user may then take inventory of what devices 102 pose the highest risk. As described below, the user may then adjust settings of one or more devices 102 to control/manage the data acquired and transmitted.

The privacy lens 107 may be configured to control or manage data transmissions from the one or more user IoT devices 102. In this regard, the privacy lens 107 may be configured to generate a user interface to allow a user to view what types of data acquired by the IoT devices 102 are transmitted from each user IoT device 102, when the data is transmitted, and any other communications characteristic of the user IoT device 102. The user interface may also receive inputs from the user and, responsive to the user inputs, control what types of data are transmitted, when the data is transmitted, and so on. In one embodiment, the privacy lens 107 may be structured as machine-readable media executable by a processor and stored in memory to receive data transmissions from the user IoT devices 102 or discovery engine 106 and to selectively filter those data transmissions. In yet another embodiment, the privacy lens 107 may be structured as any combination of hardware components and machine readable media.

In one embodiment, the privacy lens 107 may be configured to generate one or more rules that define what information is transmitted. For example, the user may desire that audiovisual data from a laptop computer never be transmitted. Accordingly, the user may define or designate (e.g., via the graphical user interface of the user device 120) one or more rules that identifies what type of information may be transmitted. The rules may be enforced by the IoT device 102, the network agent 104, the IoT server 110, a combination thereof, and/or in another manner. For example, in compliance with a standard, the IoT device 102 may have separate/designated circuitry that is secure and that disables a camera and microphone upon receipt of instructions from the IoT server 110. As another example, if the IoT device 102 continues to transmit data in violation of a rule, network access may be denied to the 102 device by the network agent 104.

The privacy lens 107 may further be configured to generate one or more action queries that are transmitted to the user device 120 of the user. Upon reception, the user device 120 may vibrate, make a tonal noise (e.g., beep or a ringtone), or any other alert mechanism used with the device 110. The action queries may be configured to allow a user to confirm or deny various actions of the privacy lens 107. For example, the privacy lens 107 may generate and transmit an action query asking the user to confirm that the user accepts transmitting data from certain user IoT devices to third party IoT devices. At which point, the user may select a subset of the IoT devices that the user agrees to allow to transmit to data (or confirm that none or all are allowed to transmit). Further, the user may then define what types of data each IoT device is allowed to transmit to third-party IoT devices. Accordingly, the action queries may allow the user to control or manage data transmissions from the user IoT devices 102.

In some embodiments, the privacy lens 107 may be equipped with a self-learning feature configured to receive the user's responses to the action queries or other information received form the user and discern preferences or other patterns of behavior for the user. In this regard, the privacy lens 107 may generate a user profile regarding the user. For example, the user may consistently limit what is shared by their Internet tracking IoT devices (e.g., laptop, smart phone, etc.) and not limit what is shared by any other IoT device (e.g., smart appliances, vehicle, etc.). As a result, the privacy lens 107 may learn to limit data transmission from those devices, such that if another smart phone is added to the local network (e.g., a smart phone belonging to the user's spouse or children), the privacy lens 107 may immediately or substantially immediately start to limit data transmission from that second smart phone devices.

Figure 2:
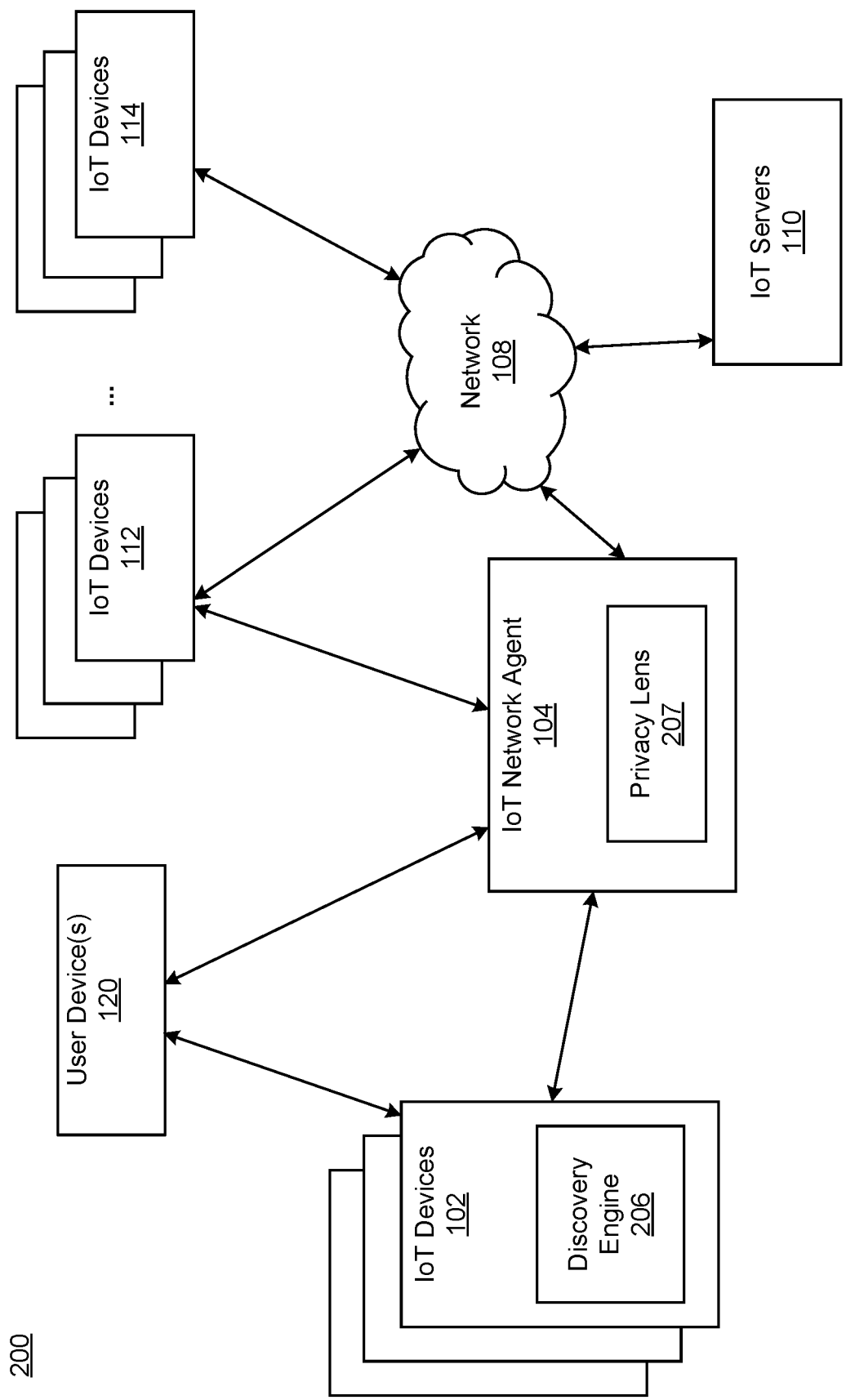
FIG. 2 is a schematic diagram of an IoT communication system, according to another example embodiment.
Figure 3:
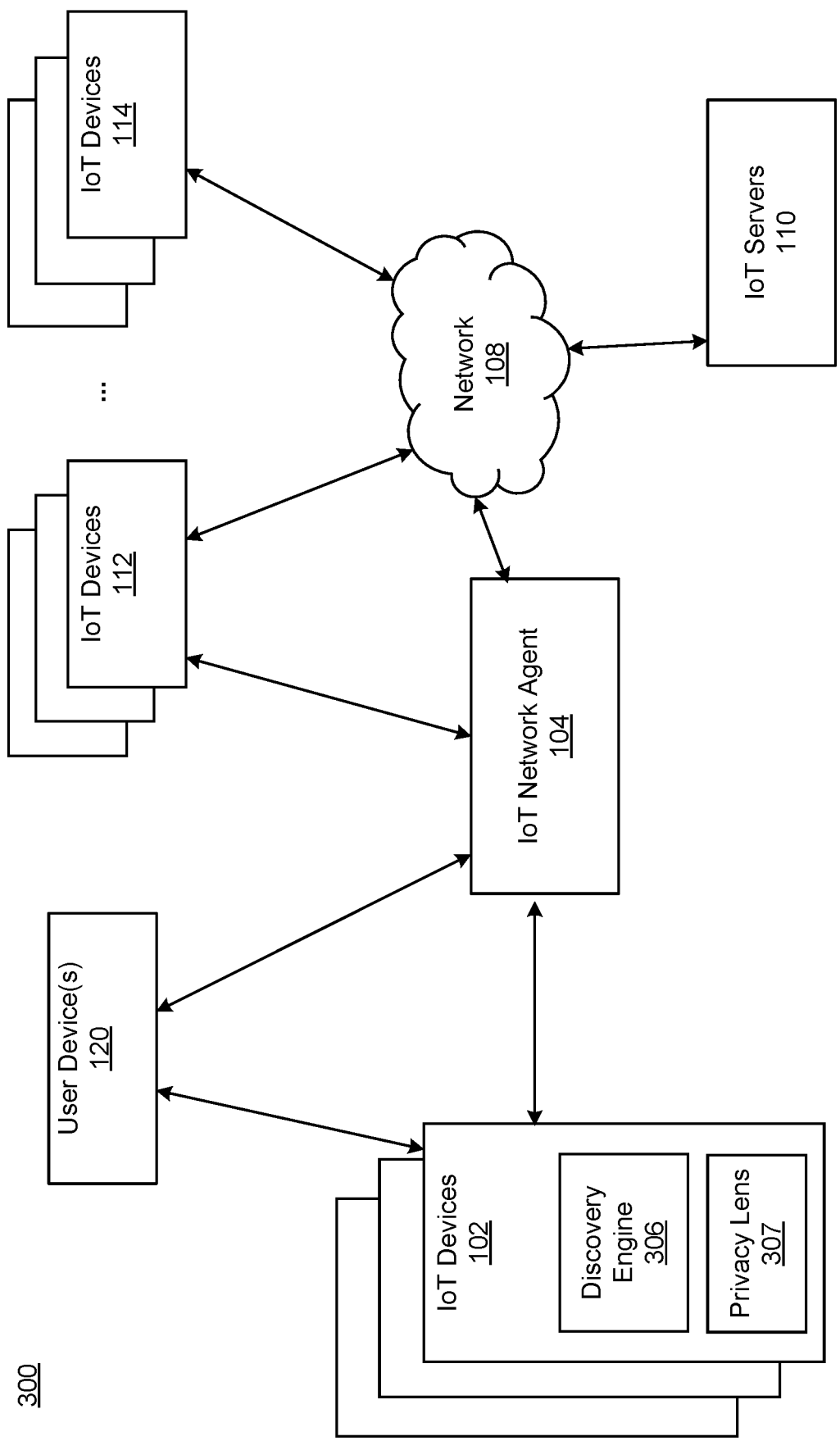
FIG. 3 is a schematic diagram of an IoT communication system, according to still another example embodiment.

Thus, those of ordinary skill in the art will appreciate that the privacy lens 107 and discovery engine 106 of the present disclosure provide users with enhanced control over their data acquired by IoT devices. While FIG. 1 depicts one implementation architecture of the privacy lens 107 and discovery engine 106, as mentioned above, other types of architectures are also possible. In this regard, FIGS. 2-3 depict additional architectures. In FIGS. 2-3, identical features are indicated by the use of similar reference numbers as those in FIG. 1.

Accordingly, referring now to FIG. 2, a schematic diagram of another IoT communication system 200 is shown, according to an example embodiment. Similar to the IoT communication system 100, the IoT communication system 200 includes one or more user IoT devices 102, an IoT network agent 104, a network 108, an IoT server 110, one or more third-party IoT devices 112 and 114, and a user device 120 associated with a user. However, relative to the IoT communication system 100, in this embodiment, the IoT network agent 104 includes the privacy lens 207 while the each or some of the user IoT devices 102 include the discovery engine 206.

In this regard, each discovery engine 206 may monitor and detect data transmissions directly from each associated user IoT device 102. Accordingly, each discovery engine 206 may have the same or similar structure and function as the discovery engine 106, except that the discovery engine 206 is included with each of the IoT devices 102. In this regard, each discovery engine 206 may transmit data regarding each IoT device to the privacy lens 207. The data monitored and tracked may include, but is not limited to, data regarding operation of the IoT device itself (including type(s) of data transmitted), a frequency of transmission, a timing of the transmission, and any other characteristic regarding the data acquired and transmitted by the IoT device 102.

In this embodiment, the privacy lens 207 may be configured to organize the data transmissions from each IoT device 102. In this regard and relative to the privacy lens 107, the privacy lens 207 may include additional functionality that is performed by the discovery engine 106 in the embodiment of FIG. 1, such as the organization of the data. Accordingly, the organization may include a timing of each data transmission for each IoT device 102, a frequency of transmission, a type of data transmitted, and so on. In response and because the privacy lens 207 is implemented at the network agent 104 which may serve a central location for receiving the data, the privacy lens 207 may be configured to generate a risk score like described herein above. Other than these additional functional differences, the privacy lens 207 may include the same or similar functionalities as described herein above with respect to the privacy lens 107 (e.g., allow a user to control and manage data transmissions from one or more IoT devices 102).

Referring now to FIG. 3, a schematic diagram of another IoT communication system 300 is shown, according to an example embodiment. Similar to the IoT communication systems 100 and 200, the IoT communication system 300 includes one or more user IoT devices 102, an IoT network agent 104, a network 108, an IoT server 110, one or more third-party IoT devices 112 and 114, and a user device 120 associated with a user. However, relative to the IoT communication systems 100 and 200, in this embodiment, each IoT device 102 includes the discovery engine 306 and privacy lens 307.

In this embodiment, each IoT device 102 may include the discovery engine 306 and privacy lens 307. In one embodiment, each IoT device 102 may include additional hardware components (e.g., an integrated circuit chip) that includes circuitry that implements each of the discovery engines 306 and the privacy lenses 307. This configuration may enhance robustness against surreptitious measures designed to defeat operation of the discovery engine 106 and privacy lens 107. In another embodiment, each IoT device 102 may be updated with machine-readable media (e.g., programmable logic) that facilitates implementation of the discovery engine 306 and privacy lens 307 with each IoT device 102.

Relative to the discovery engine 106 and privacy lens 107, the discovery engine 306 and privacy lens 307 may have the same or similar structure and function as the discovery engine 10 and privacy lens 107 except that each component is operable on a per IoT device 102 basis. Accordingly, via the user device 120, the user may access the privacy lens 107 and control/manage data transmissions for the corresponding IoT device 102.

Figure 4:
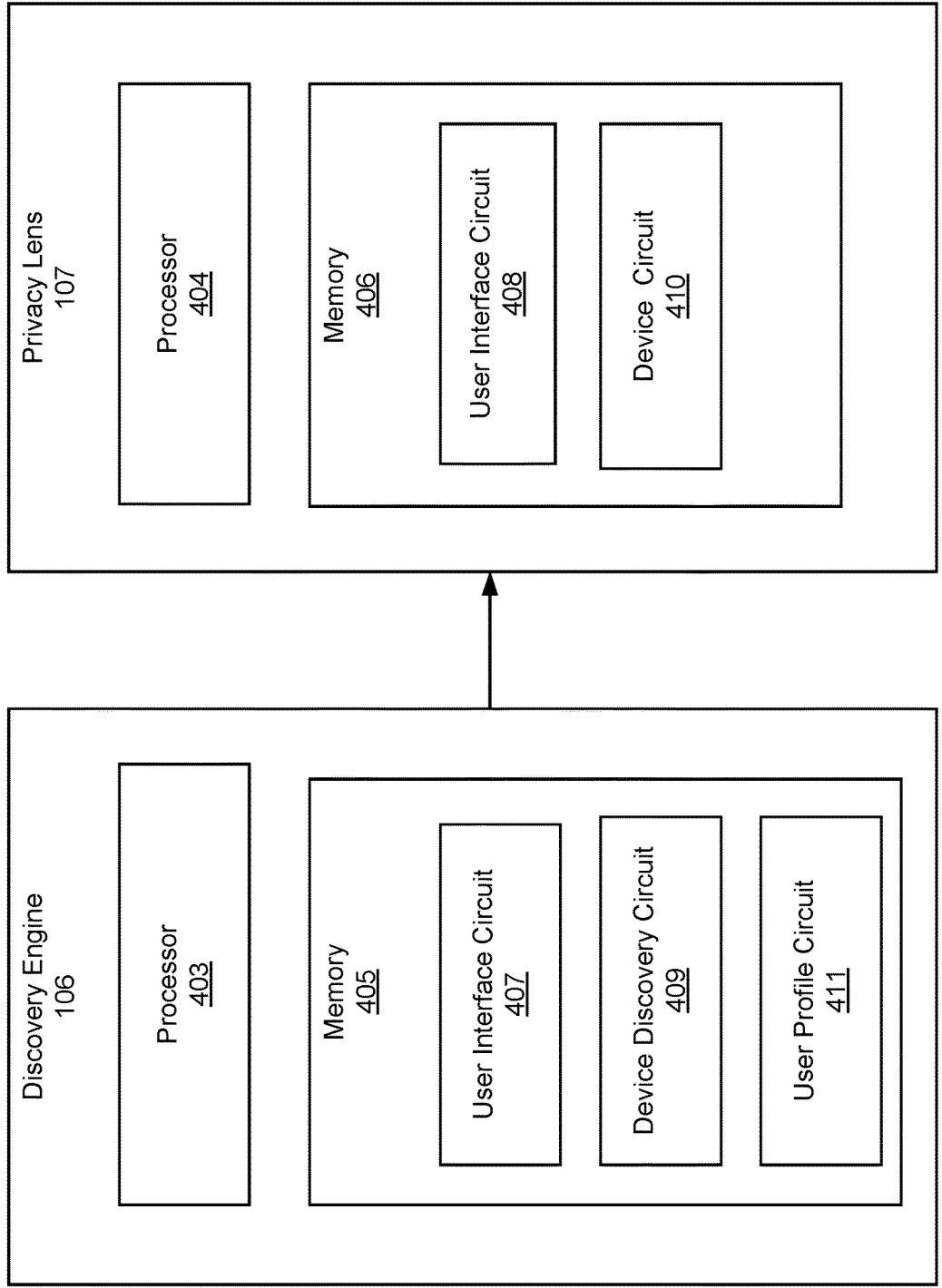
FIG. 4 is a block diagram of a discovery engine and a privacy lens for an IoT communication system, according to an example embodiment.

Referring now to FIG. 4, a block diagram of the discovery engine and the privacy lens in an IoT communication system 400 are shown, according to an example embodiment. In this example, the IoT communication system 400 has the same configuration as the IoT communication system 100 architecture of FIG. 1. As shown, the communication system 400 includes one or more discovery engines 106 and one or more privacy lenses 107 for allowing a user to manage data transmissions from their IoT devices.

As shown, the discovery engine 106 includes a processor 403 and a memory 405 having a user interface circuit 407, a device discovery circuit 409, and a user profile circuit 411. The processor 403 may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices 405 (e.g., RAM, NVRAM, ROM, Flash Memory, hard disk storage, etc.) may store data and/or computer code for facilitating the various processes described herein. Moreover, the one or more memory devices 405 may be or include tangible, non-transient volatile memory or non-volatile memory. Accordingly, the one or more memory devices 405 may include database components, object code components, script components, or any other type of information structure for supporting the various activities and information structures described herein.

As shown, the discovery engine 106 includes various circuits and interfaces for completing at least some of the activities described herein. More particularly, the discovery engine 106 includes a user interface circuit 407, a device discovery circuit 409, and a user profile circuit 411. While various circuits and interfaces with particular functionality are shown in FIG. 4, it should be understood that the user device discovery engine 106 may include any number of circuits, interfaces, and logic for completing the functions described herein. For example, the activities of multiple circuits may be combined as a single circuit, as additional circuits with additional functionality may be included, etc.

The user interface circuit 407 may facilitate the exchange of information between a user and the discovery engine 106. Accordingly, in one embodiment, the user interface circuit 407 may include communication circuitry, machine-readable media, or some combination therewith for facilitating the exchanging of information between the discovery engine 106 and the user. As an example, a graphical user interface may be provided on the user device 120, wherein the graphical user interface includes one or more buttons, icons, switches, or other input/output mechanisms for exchanging information with the user interface circuit 407. In another embodiment, a dedicated user interface (e.g., an interface provided on the IoT network agent 104) may be or be communicably coupled to the user interface circuit 407. As those of ordinary skill in the art will appreciate, the user interface circuit 407 may have a variety of configurations with all such arrangements intended to fall within the spirit and scope of the present disclosure.

The user interface circuit 407 may facilitate reception of one or more inputs from the user. For example, the user may input one or more discovery rules through the user interface circuit 407 to the discovery engine 106, wherein the one or more discovery rules are structured to be utilized to identify IoT devices. An example may be to identify all IoT devices that are currently transmitting data within a prescribed radius or area. Another example may be to identify all IoT devices within a prescribed radius or area. Still another example may be to identify all IoT devices of a certain type (e.g., smartphones). Yet another example may be to identify all IoT devices that are engaging in external communications. In this regard, the one or more discovery rules may be highly configurable and vary based upon the architecture of the system.

The device discovery circuit 409 may be configured to discover IoT devices. Accordingly, the one or more discovery rules received by the user interface circuit 407 or predefined with the device discovery circuit 409 may predefine searching, identification, and any other process or method of discovering IoT devices. In one embodiment, the device discovery circuit 409 is configured to detect user IoT devices and third-party IoT devices proximate the user (e.g., within signal range of the user, within a predefined communication distance of the user, etc.).

In some embodiments, the device discovery circuit 409 may be configured to detect a change of an operational state and a change of settings for each of the detected IoT devices. For example, the device discovery circuit 409 may be configured to detect a smart phone when it is turned on from an off-state. Further, the device discovery circuit 409 may be configured to detect a smart phone when it is switched from a cellular connection to a WI-FI connection.

The device discovery circuit 409 may be configured to generate a device risk score for each detected user IoT device based on the types and settings of the detected user IoT device. The risk score generation may be described herein above in regard to the discovery engine 106. For example, the device discovery circuit 409 may be configured to generate a higher risk score for IoT devices that are determined to transmit data considered to be more sensitive by users, such as audiovisual data.

The device discovery circuit 409 may also be configured to detect the types and amount of data that is shared by each of the user IoT devices. Responsive to the ascertainment of the shared data, the device discovery circuit 409 may be configured to analyze the types and amounts of data communications to determine a frequency of each type of data communication, the amount of each type of data transmitted for each IoT device, and any other organizational characteristic regarding the data as a whole.

The user profile circuit 411 may be configured to generate a user privacy profile associated with the user. The user profile may include information regarding the user including the risk scores, inputted user preferences, and any other information regarding the user. In this regard, the user profile circuit 411 may generate an observable profile for the user, where the observable profile includes data transmission characteristics for each IoT device 102. In this regard, the user may be able to control various data transmission characteristics at-will in the profile. For example, the user may observe that their smart appliance is exchanging data with their neighbor's smart appliance and then by the flip of a switch, cease such data exchange. In another example, the user may observe that an application their smartphone is exchanging their identity information with other applications on their smartphone and then by the flip of a switch, the user may cease such identity information exchange. Accordingly, the user may manually control/manage data transmissions from their IoT devices. However, such control and management may be performed automatically or nearly automatically by the privacy lens 107 as well.

In this regard, the privacy lens 107 may be configured to receive the user privacy profile from the discovery engine 106, and generate one or more privacy rules based on the received user privacy profile. The privacy lens 107 includes a processor 404 and a memory 406 having a user interface circuit 408 and a device circuit 410. The processor 404 may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices 406 (e.g., RAM, NVRAM, ROM, Flash Memory, hard disk storage, etc.) may store data and/or computer code for facilitating the various processes described herein. Moreover, the one or more memory devices 406 may be or include tangible, non-transient volatile memory or non-volatile memory. Accordingly, the one or more memory devices 406 may include database components, object code components, script components, or any other type of information structure for supporting the various activities and information structures described herein.

While the privacy lens 107 is shown as a separate processing system relative to the discovery engine 106, this configuration is for illustrative purposes only. In other configurations, the privacy lens 107 and discovery engine 106 may be joined in a single processing system and unit. All such variations are intended to fall within the scope of the present disclosure.

As shown and mentioned above, the privacy lens 107 includes a user interface circuit 408 and a device circuit 410. While various circuits and interfaces with particular functionality are shown in FIG. 4, it should be understood that the user device discovery engine 106 may include any number of circuits, interfaces, and logic for completing the functions described herein. For example, the activities of multiple circuits may be combined as a single circuit, as additional circuits with additional functionality may be included, etc.

The user interface circuit 408 may facilitate the exchange of information between a user and the privacy lens 107. Accordingly, in one embodiment, the user interface circuit 408 may include communication circuitry, machine-readable media, or some combination therewith for facilitating the exchanging of information between the privacy lens 107 and the user. As an example, a graphical user interface may be provided on the user device 120, wherein the graphical user interface includes one or more buttons, icons, switches, or other input/output mechanisms for exchanging information with the user interface 406. In another embodiment, a dedicated user interface (e.g., an interface provided on the IoT network agent 104) may be or be communicably coupled to the user interface circuit 408. As those of ordinary skill in the art will appreciate, the user interface circuit 408 may have a variety of configurations with all such arrangements intended to fall within the spirit and scope of the present disclosure.

The user interface circuit 408 may be configured to allow the processor 404 to communicate with and receive control instructions from the user. The control instructions may include rules that define what IoT devices are allowed to transmit and to which locations, the type and frequency of transmission, and any other rule or instructions intended to manage the communications from the IoT devices 102. For example, via the user interface circuit 408, the user may activate one or more applications in the user IoT devices including an action query within each of the activated applications for the user to confirm before transmitting certain data from the user IoT devices.

The device circuit 410 is communicably coupled to one or more of the user IoT devices 102 and/or IoT servers 110, such that the device circuit 410 may implement the one or more control instructions with the one or more IoT devices 102. In one embodiment, the device circuit 410 includes communication circuitry for communicably coupling the privacy lens 107 to each IoT device 102. In another embodiment, the device circuit 410 includes machine-readable media that facilitates the exchange of information between the device circuit 410 and the one or more IoT devices 102 and/or IoT servers 110. In yet another embodiment, the device circuit 410 includes any combination of communication circuitry and machine-readable media.

To implement control over the one or more IoT devices 102, the device circuit 410 may send a control instruction to the desired IoT device 102 and/or associated IoT server 110. In response, a user may be required to authorize implementation of the control instruction. For example, if the control instruction is intended to limit shared data from a smartphone of a user, the privacy lens 107 may transmit the control instruction, which causes the smartphone to vibrate or any other notification action. The user may then need to unlock their smartphone and scroll through a graphical user interface to enable implementation of the control instruction. In another embodiment, the device circuit 410 may transmit the control instruction to the IoT server 110. The IoT server 110 may then selectively cause transmission of the control instruction to the associated IoT device to dictate at least one of the data the IoT device acquires, transmits (e.g., destination location, frequency of transmission, etc.), and stores. In this regard, the control instruction may be configured to manage the data transmission of one or more IoT devices 102.

Accordingly, the device circuit 410 may either receive the user profile that defines preferences of the user or have predefined control instructions for managing and control data transmissions from each one or some of the IoT devices 102. In either configuration, after determination or reception of the control instructions, the device circuit 410 may then automatically or nearly automatically manage and control data transmissions from each one or some of the IoT devices.

Figure 5:
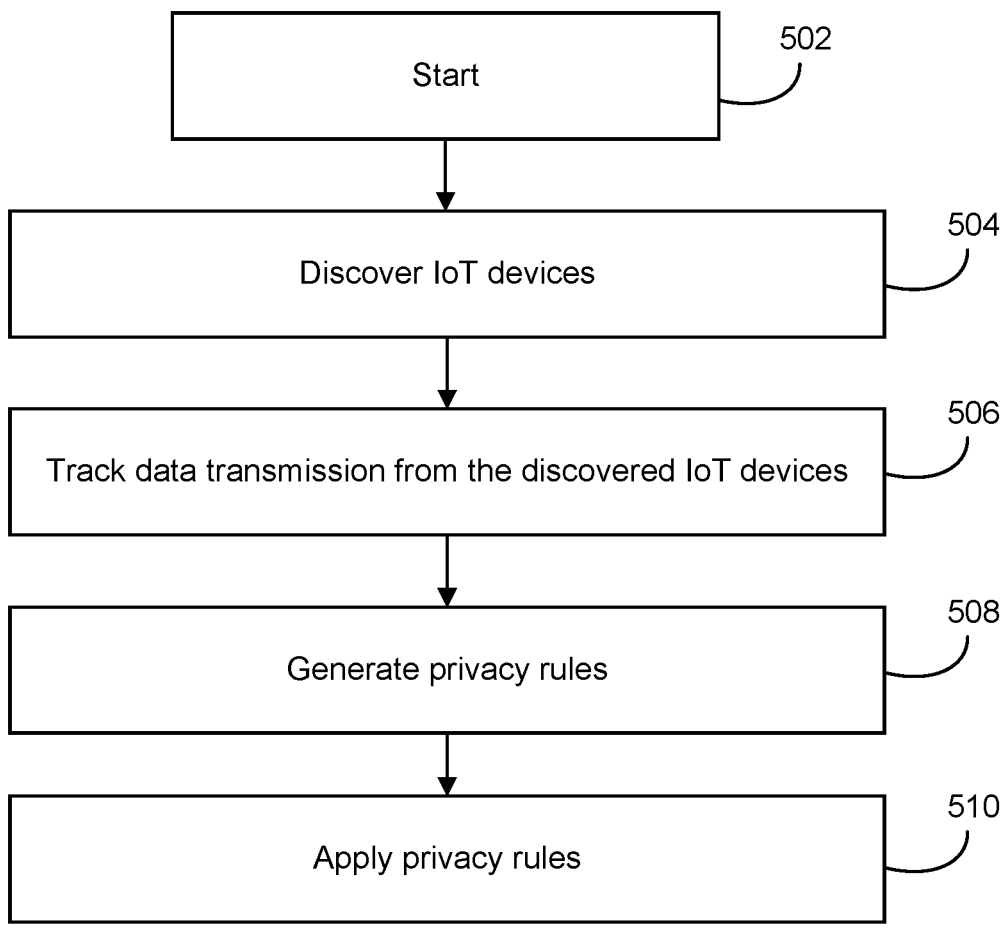
FIG. 5 is flow diagram of a process of managing communications in an IoT communication system, according to an example embodiment.

Referring now to FIG. 5, a flow diagram of a process 500 of managing communications in an IoT communication system with a privacy lens is shown, according to an example embodiment. Because the process 500 may be implemented with the privacy lens 107 and discovery engine 106, reference may be made to one or more components of the privacy lens 107 and discovery engine 106 to aid explanation of the process 500.

At process 500, one or more discovery engines and one or more privacy lenses are activated. In this regard, there may be a subscription requirement or enrollment requirement where the user must first enroll before using the privacy lens and discovery engine to monitor and filter their data transmissions from their one or more IoT devices. As part of the subscription or enrollment, a fee may be required, where part of the fee may be provided to the IoT server. In this regard and as mentioned above, the IoT server 110 may need to unlock an associated IoT device or provide certain permissions to the user to allow that user to intercept or otherwise monitor data transmissions from one or more of their IoT devices.

At process 504, one or more IoT devices 102, 112, 114 are discovered. In this regard and in one embodiment, the devices may be detected by the discovery engine 106 because the discovery engine 106 is disposed as an intermediary between the transmission location destination (e.g., IoT sever 110) and the IoT device itself. In another embodiment, the discovery engine 106 may receive permission from an associated IoT server 110 to monitor communications from an IoT device.

At process 506, data transmissions from the discovered IoT devices are tracked. In this regard, tracking may include determining what types of data are transmitted, the locations for each type of data, the frequency of transmission, the timing of transmission, etc.

At process 508, one or more privacy rules are generated. In this regard, a user may provide various user preferences that define the types of data that are acceptable sharing, acceptable transmission destination locations for various pieces of data or devices, and so on. The aggregation of the user preferences may form a user profile. The user profile may be used by the privacy lens to generate privacy rules, wherein the privacy rules (also referred to above as control instructions) are configured to manage and control data transmissions from the one or more IoT devices.

At process 510, the privacy rules are applied. In this regard, application of the privacy rules may include providing a command to the associated IoT device for each privacy rule to implement the privacy rule. For example, the privacy rule may be to not share any data from a smart appliance, and at process 510, the privacy rule is provided to the smart appliance for implementation. Beneficially, application of the privacy rules may restrict or limit data transmission from a user's IoT devices in accordance with the preferences of that user.

Process 500 may also include checking the subsequent transmitted data for following the applied privacy rules. In this regard, the discovery engine 106 may provide to a graphical user interface information regarding each discovered IoT device. A user may then observe if the data is being filtered as desired. Alternatively, an internal check may be included with the privacy lens 107 to verify implementation of the privacy rule.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system, comprising:
a network agent in data communication with one or more Internet of Things (IoT) devices and an IoT server, the network agent disposed as an intermediary for communications between the one or more IoT devices and the IoT server, the network agent comprising a processing circuit structured to:
discover the one or more IoT devices;
control data communications between the one or more IoT devices and the IoT server based on a received user privacy profile associated with a user;
restrict audiovisual data transmission by at least one of the one or more IoT devices based on the received user privacy profile associated with the user by providing an instruction to the at least one of the one or more IoT devices;
determine that the at least one of the one or more IoT devices is continuing to transmit audiovisual data to the IoT server subsequent to the restriction;
based on the determination that the at least one of the one or more IoT devices is continuing to transmit audiovisual data subsequent to the restriction, deny network access of the at least one of the one or more IoT devices; and
present, via a user device, a user interface comprising an indication regarding whether communications to the IoT server have been blocked for each of the one or more IoT devices.

2. The system of claim 1, wherein the control of the data communications includes restricting a type of data transmitted from the one or more IoT devices.

3. The system of claim 1, wherein the control of the data communications includes restricting a specific one of the one or more IoT devices from transmitting data.

4. The system of claim 1, wherein the network agent is further configured to generate a risk value based on data transmissions for each of the one or more IoT devices, the risk value associated with a risk score.

5. The system of claim 1, wherein the network agent is separate from the IoT server.

6. The system of claim 1, wherein discovering the one or more IoT devices comprises detecting the one or more IoT devices within a predefined area.

7. The system of claim 1, wherein the network agent is configured to transmit an action query to the user that is configured to enable the control data communications between each of the one or more IoT devices and the IoT server.

8. A method, comprising:
discovering, by a network agent, one or more Internet of Things (IoT) devices;
tracking, by the network agent, data transmission between the one or more IoT devices and an IoT server;
restricting audiovisual data transmission by at least one of the one or more IoT devices based on a user profile associated with a user by providing an instruction to the at least one of the one or more IoT devices;
determining that the at least one of the one or more IoT devices is continuing to transmit audiovisual data to the IoT server subsequent to the restriction;
based on the determination that the at least one of the one or more IoT devices is continuing to transmit audiovisual data subsequent to the restriction, denying network access of the at least one of the one or more IoT devices; and
presenting, via a user device, a user interface comprising an indication regarding whether communications to the IoT server have been prevented for each of the one or more IoT devices.

9. The method of claim 8, wherein the user profile is configured to restrict potential recipients of the data transmission from the one or more IoT devices, the potential recipients including the IoT server.

10. The method of claim 8, wherein the user profile is configured to restrict a type of data being transmitted from the one or more IoT devices.

11. The method of claim 8, wherein the user profile is configured to restrict at least one of a timing and a frequency of data being transmitted from the one or more IoT devices.

12. The method of claim 8, further comprising: generating, by the network agent, a risk value associated with each of the one or more IoT devices.

13. The method of claim 12, wherein the risk value is based on a recipient of data transmitted by each of the one or more IoT devices.

14. The method of claim 12, further comprising providing, by the network agent, a graphical user interface to the user device of the user associated with the one or more IoT devices, the graphical user interface providing an indication of the risk value associated with each of the one or more IoT devices.

15. A non-transitory computer-readable medium storing instructions therein that, when executed by one or more processors, cause the one or more processors to perform operations comprising:
- discovering one or more Internet of Things (IoT) devices;
- acquiring information regarding data transmissions of the one or more IoT devices;
- managing data transmissions from the one or more IoT devices to an IoT server based on a user profile of a user associated with the one or more IoT devices;
- restricting audiovisual data transmission by at least one of the one or more IoT devices based on the user profile associated with the user by providing an instruction to the at least one of the one or more IoT devices;
- based on the at least one of the one or more IoT devices continuing to transmit audiovisual data subsequent to the restriction, denying network access of the at least one of the one or more IoT devices; and
- presenting a user interface comprising information regarding communications regarding at least one of the one or more IoT devices and the IoT server.

16. The non-transitory computer-readable medium of claim 15, wherein the user profile includes information regarding a type of data that the user agrees to share, an IoT device of the one or more IoT devices that the user allows to share data, and a recipient that the user accepts as receiving data from the one or more IoT devices.

17. The non-transitory computer-readable medium of claim 15, wherein the managing of the data transmissions includes restricting potential recipients of the data transmissions from the one or more IoT devices.

18. The non-transitory computer-readable medium of claim 15, wherein the user profile includes a risk score for each of the one or more IoT devices based on a device type, a data transmission frequency, and a transmitted data type such that communications from the one or more IoT devices to the IoT server are restricted when a corresponding risk score is above a value.

19. The non-transitory computer-readable medium of claim 15, wherein the managing of the data transmissions includes restricting at least one of a timing and a frequency of data being transmitted from the one or more IoT devices.

20. The non-transitory computer-readable medium of claim 15, wherein discovering the one or more IoT devices includes detecting the one or more IoT devices within a predefined area.

* * * * *